United States Patent
Bradley

(10) Patent No.: US 8,184,347 B2
(45) Date of Patent: May 22, 2012

(54) OPPORTUNISTIC PROCESS CONTROL FOR PRINTERS

(75) Inventor: Timothy G. Bradley, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 260 days.

(21) Appl. No.: 12/002,210

(22) Filed: Dec. 13, 2007

(65) Prior Publication Data

US 2009/0153904 A1 Jun. 18, 2009

(51) Int. Cl.
| | |
|---|---|
| H04N 1/00 | (2006.01) |
| H04N 1/04 | (2006.01) |
| H04N 1/56 | (2006.01) |
| H04N 1/60 | (2006.01) |
| H04N 17/00 | (2006.01) |
| G03F 3/00 | (2006.01) |
| G03F 3/10 | (2006.01) |

(52) U.S. Cl. ....... 358/504; 358/1.81; 358/500; 358/501; 358/514; 358/518; 358/406

(58) Field of Classification Search .................. 358/1.18, 358/500, 501, 504, 514, 518, 406
See application file for complete search history.

(56) References Cited

U.S. PATENT DOCUMENTS

| | | | |
|---|---|---|---|
| 5,448,277 A | 9/1995 | Long | |
| 5,576,811 A * | 11/1996 | Kobayashi et al. | 399/60 |
| 5,809,366 A * | 9/1998 | Yamakawa et al. | 399/39 |
| 5,906,442 A * | 5/1999 | Kishida | 400/61 |
| 5,933,676 A * | 8/1999 | Ohno | 399/8 |
| 5,966,222 A * | 10/1999 | Hirata et al. | 358/520 |
| 6,157,790 A * | 12/2000 | Noguchi | 399/15 |
| 6,288,790 B1 | 9/2001 | Yellepeddy et al. | |
| 6,435,643 B1 * | 8/2002 | Miura et al. | 347/19 |
| 6,650,416 B2 * | 11/2003 | Tandon et al. | 356/420 |
| 6,793,321 B2 * | 9/2004 | Fujimori | 347/41 |
| 6,912,674 B2 * | 6/2005 | Trelewicz et al. | 714/44 |
| 6,950,197 B1 * | 9/2005 | Nakajima | 358/1.1 |
| 6,966,712 B2 * | 11/2005 | Trelewicz et al. | 400/76 |
| 7,027,187 B1 * | 4/2006 | Zuber | 358/1.9 |
| 7,061,648 B2 * | 6/2006 | Nakajima et al. | 358/1.9 |
| 7,068,388 B2 * | 6/2006 | Kimura | 358/1.15 |
| 7,207,645 B2 * | 4/2007 | Busch et al. | 347/19 |
| 7,209,262 B2 * | 4/2007 | Komatsu | 358/2.1 |

(Continued)

FOREIGN PATENT DOCUMENTS

JP 09-187999 * 7/1997

(Continued)

OTHER PUBLICATIONS

Atkinson, Malcolm, et al., "Proceedings of the Second International Workshop on Persistence and Java", (Dec. 1997).

(Continued)

*Primary Examiner* — King Poon
*Assistant Examiner* — Beniyam Menberu
(74) *Attorney, Agent, or Firm* — Blakely, Sokoloff, Taylor & Zafman LLP

(57) ABSTRACT

A method is disclosed. The method includes receiving print data at an electrophotographic printer; examining the print data to determine if an image within the print data may be used to perform one or more process control measurements and performing the process control measurement if it is determined that the image may be used.

20 Claims, 4 Drawing Sheets

U.S. PATENT DOCUMENTS

| | | | |
|---|---|---|---|
| 7,230,739 B2 | 6/2007 | Takahashi | |
| 7,489,422 B2 * | 2/2009 | Zuber | 358/1.9 |
| 7,609,414 B2 * | 10/2009 | Kumada et al. | 358/1.9 |
| 2003/0019382 A1 * | 1/2003 | Furukawa | 101/484 |
| 2003/0042399 A1 * | 3/2003 | Chiu | 250/208.1 |
| 2004/0027595 A1 * | 2/2004 | Senn | 358/1.9 |
| 2004/0046811 A1 * | 3/2004 | D'Souza et al. | 347/12 |
| 2004/0179717 A1 * | 9/2004 | Furukawa et al. | 382/112 |
| 2004/0223025 A1 * | 11/2004 | D'souza et al. | 347/19 |
| 2005/0018219 A1 * | 1/2005 | Senn et al. | 358/1.8 |
| 2005/0117925 A1 * | 6/2005 | Tanaka et al. | 399/49 |
| 2005/0135823 A1 * | 6/2005 | Ng | 399/49 |
| 2005/0151985 A1 * | 7/2005 | Hisamura | 358/1.12 |
| 2005/0158086 A1 | 7/2005 | Sato et al. | |
| 2005/0190389 A1 * | 9/2005 | Tanaka | 358/1.9 |
| 2005/0195233 A1 * | 9/2005 | Tanaka | 347/15 |
| 2005/0207768 A1 | 9/2005 | Suzuki | |
| 2006/0033943 A1 | 2/2006 | Yanagi | |
| 2006/0066882 A1 * | 3/2006 | Yamauchi et al. | 358/1.9 |
| 2006/0187484 A1 | 8/2006 | Noda | |
| 2007/0188485 A1 * | 8/2007 | Yasukawa | 345/419 |
| 2007/0263239 A1 * | 11/2007 | Miyata | 358/1.9 |
| 2008/0218814 A1 * | 9/2008 | Ferlitsch | 358/500 |
| 2009/0033970 A1 * | 2/2009 | Bray et al. | 358/1.13 |
| 2009/0059311 A1 * | 3/2009 | Nelson et al. | 358/406 |
| 2009/0244566 A1 * | 10/2009 | Jackson et al. | 358/1.9 |

FOREIGN PATENT DOCUMENTS

| | | | |
|---|---|---|---|
| JP | 2001034047 | | 2/2001 |
| JP | 2004-038091 | * | 2/2004 |
| JP | 2004-272169 | * | 9/2004 |
| JP | 2005-222172 | * | 8/2005 |

OTHER PUBLICATIONS

Littlewood, D. J., et al., "Pareto-Optimal Formulations for Cost versus Colorimetric Accuracy Trade-Offs in Printer Color Management", (2002).

"PCT Search Report and Written Opinion", PCT/US 08/13752, (Feb. 12, 2009), 1/10.

"Supplementary European Search Report", PCT/US2008013752, (Feb. 2, 2012), 3 pages.

US 7,599,089, 10/2009, Hara (withdrawn)*

* cited by examiner

OPPORTUNISTIC PROCESS CONTROL FOR PRINTERS

FIELD OF THE INVENTION

This invention relates generally to the field of electrophotographic printing systems. More particularly, the invention relates to managing process control for electrophotographic printing systems.

BACKGROUND

An electrophotographic printing system typically needs to continually regulate a toning density of an imaging subsystem by periodically reading image density and adjusting various imaging parameters to maintain the desired image density. The imaging subsystem can be adjusted by attempting to print a uniformly toned patch (or target) onto the sheet transport mechanism and then taking one or more process variable measurements of the printed patch.

In order to accurately read the patch, the patch position on the transport mechanism must be accurately tracked from the point of it being printed onto the transport mechanism to the point of it being read by a densitometer sensor. For example, the patch may be printed so that the reflectance (mass deposit) of the developed toner can be measured with a reflectance meter. That information is subsequently used to adjust exposure or toner concentration. In another example, a specific pattern of two or more colors may be printed to evaluate color plane registration for a color printer.

To conduct these process measurements, it is likely that the printing process will be interrupted so that the control images can be printed. For production printers that handle large, high-volume print jobs, interruptions to carry out process control measurements reduces the printer throughput and creates waste.

In some instances cut sheet printers are able to perform these process control steps in an inter-image gap between pages. However, with increasing process speeds the gaps are becoming too small to print the required control images. Moreover, continuous forms printers generally do not have an inter-image gap to use for process control measurements. Printing the control images on the edge of the media or in a designated band may be implemented. Nonetheless, wasted paper and additional steps required to trim off the image that is not part of the print job is a result.

SUMMARY

In one embodiment, a method is disclosed. The method includes receiving print data at an electrophotographic printer; examining the print data to determine if an image within the print data may be used to perform one or more process control measurements and performing the process control measurement if it is determined that the image may be used.

In another embodiment, an electrophotographic printing system is disclosed. The printing system includes a control unit to examine received print data to determine if an image within the print data may be used to perform one or more process control measurements at the printing system and a print head to write the print data at the electrophotographic printing system to a medium.

BRIEF DESCRIPTION OF THE DRAWINGS

A better understanding of the present invention can be obtained from the following detailed description in conjunction with the following drawings, in which.

DETAILED DESCRIPTION

An opportunistic process control system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
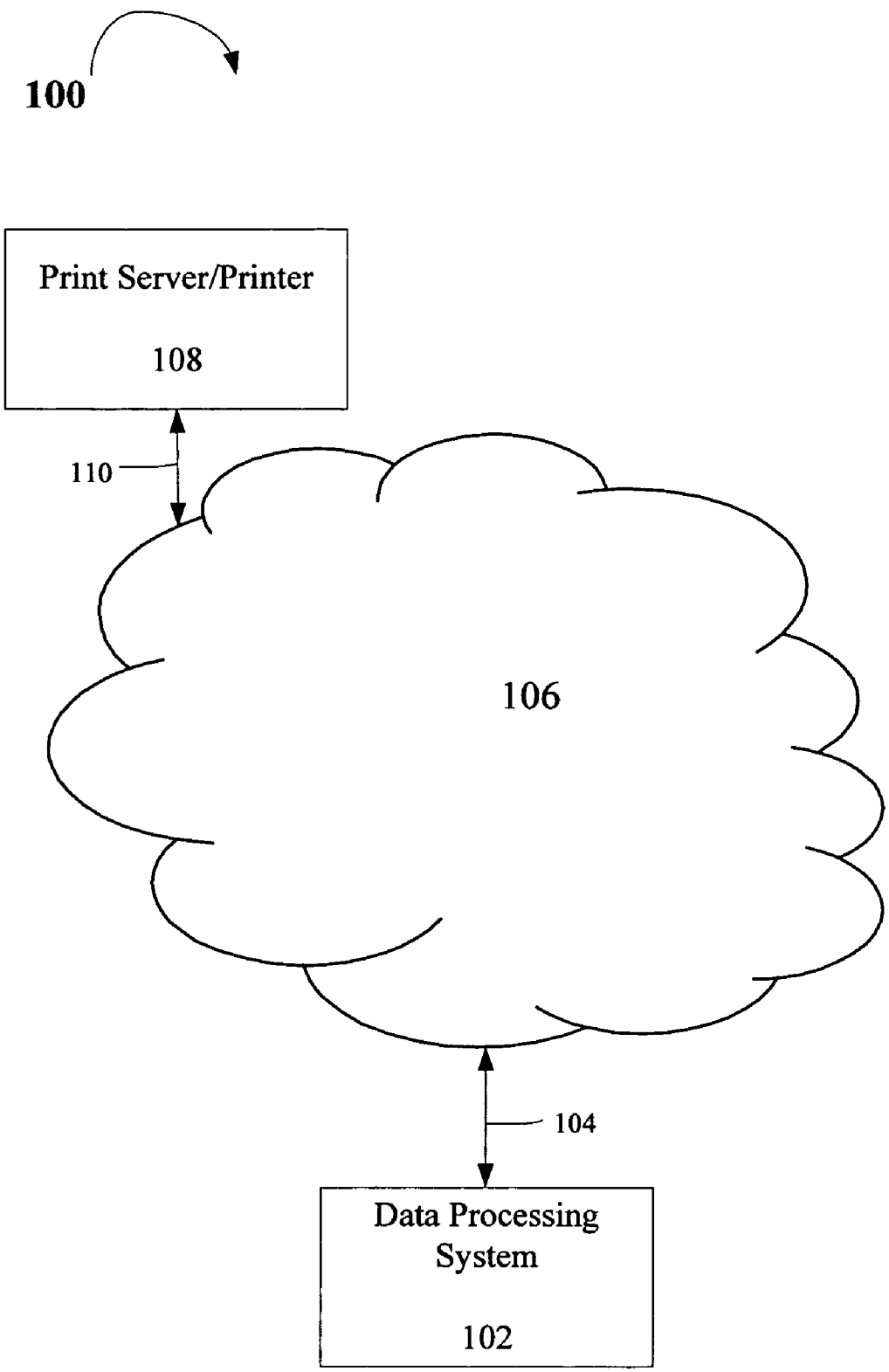
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. Data processing system 102 in accordance with the present invention preferably includes and employs the OS/2 operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems.

The data processing system network depicted in FIG. 1 is selected for the purposes of explaining and illustrating the present invention and is not intended to imply architectural limitations. Those skilled in the art will recognize that various additional components may be utilized in conjunction with the present invention.

Figure 2:
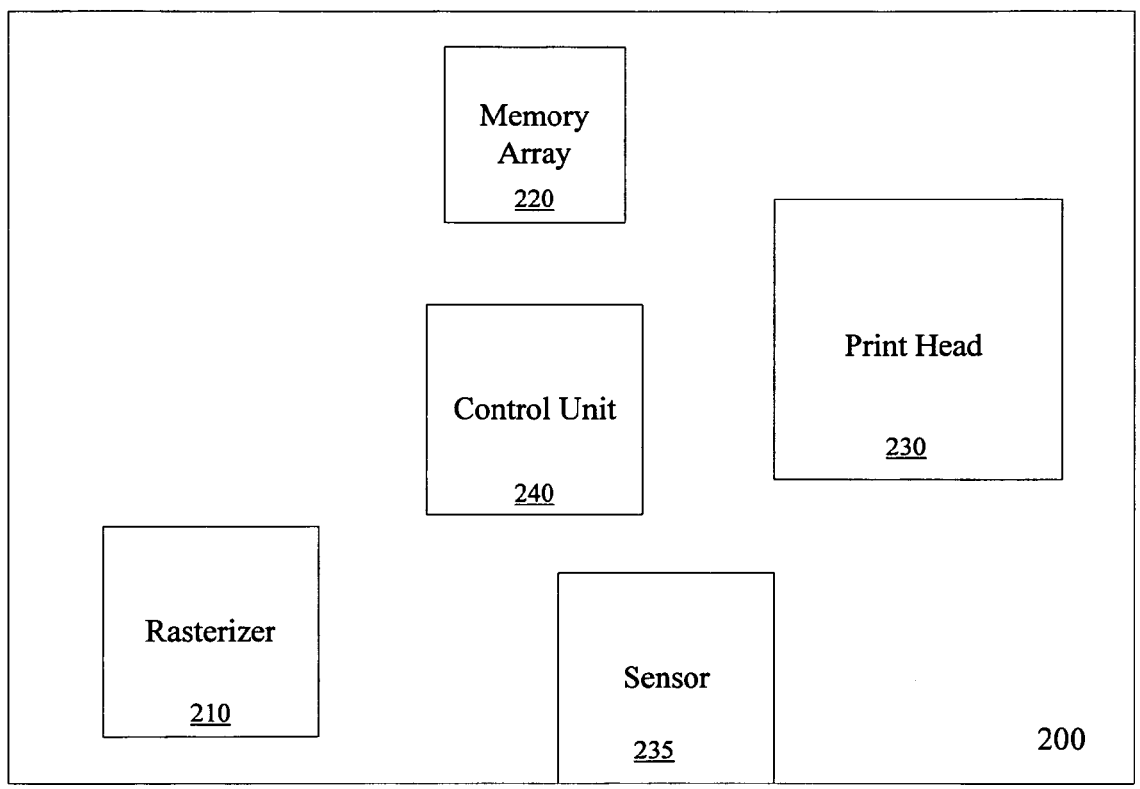
FIG. 2 illustrates one embodiment of an electrophotographic printer.

FIG. 2 illustrates one embodiment of an electrophotographic printer 200. In one embodiment, electrophotographic printer 200 is implemented as the printing component of print server/printer 108. Printer 200 includes a rasterizer 210, memory array 220, print head 230, sensor 235 and control unit 240.

Rasterizer 210 is implemented to convert vector information received at printer 200 into a raster format. Particularly, rasterizer 210 generates a raster scan of a received image that is to be stored as scan line data in memory array 220. Print head 230 includes a printing element that prints to a print medium.

In one embodiment, print head 230 employs a light source (e.g., gas laser) and an acousto-optic modulator for modulating the laser beam power in to perform printing in embodiments where printer 200 is a laser printer. However, one of ordinary skill in the art will appreciate that different print head 230 components will be implemented in other types of applications (e.g., ink jet, dot matrix, etc.).

Sensor 235 is implemented to perform one or more process control measurements by analyzing a printed test image. For instance, sensor 235 may be a reflectance sensor that is used to test a process control loop for toner density on a photoconductor.

Control unit 240 controls the operation of print head 230. In another embodiment, control unit 240 also controls the process control for printer 200. In such an embodiment, control unit 240 performs opportunistic process control by identifying images within a print job received from data processing system 102 and using the identified images to measure one or more process variables. Such process variables may include, for example, print head 230 exposure value, toner concentration, developer bias, photo conductor exposure values, etc.

Figure 3:
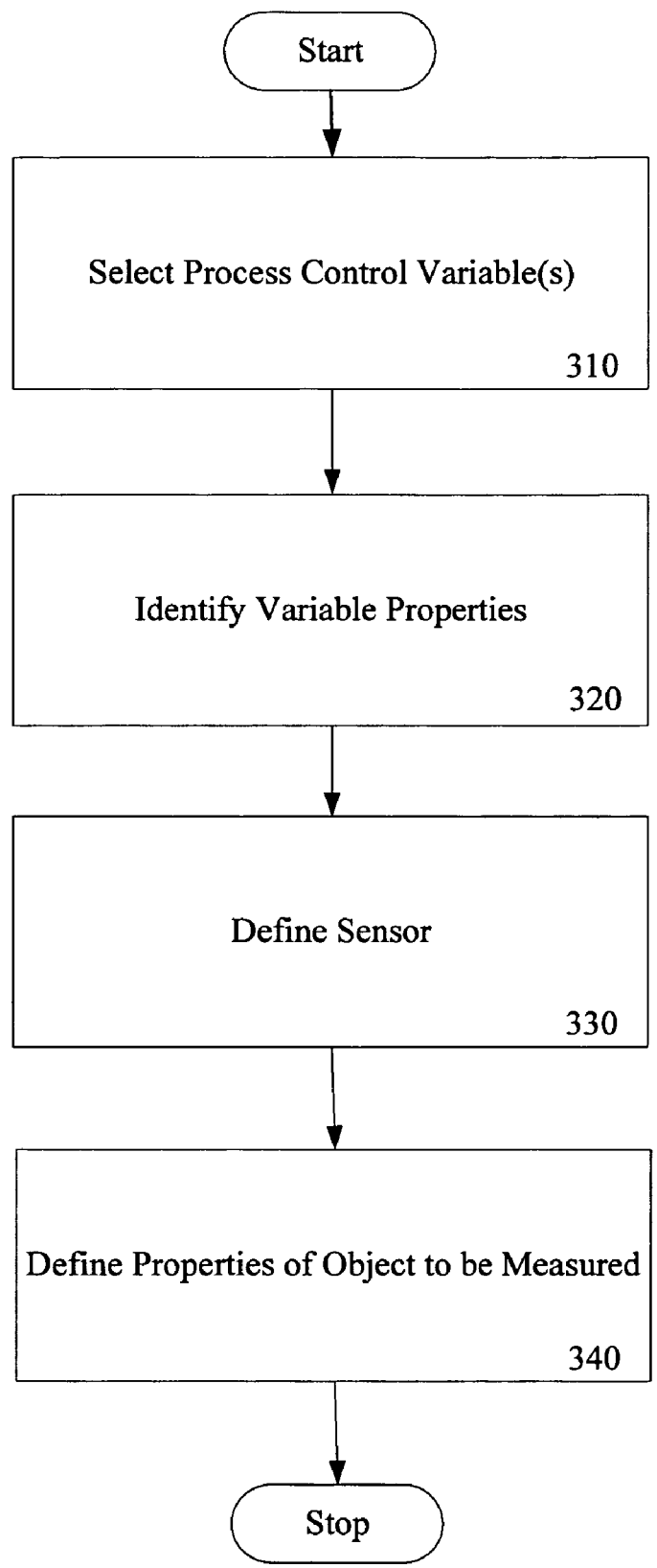
FIG. 3 is a flow diagram for one embodiment of selecting variables/properties at an electrophotographic printer.

In one embodiment, the processes of selecting variables/properties and defining image properties occurs prior to printer operation (e.g., prior to printer 200 installation or during maintenance). FIG. 3 is a flow diagram for one embodiment of selecting variables/properties and defining image properties at printer 200.

At processing block 310, one or more process variables to be measured during process control are selected. At processing block 320, properties associated with each variable (e.g., field of view and integration time) are identified. In one embodiment, these process variables and their corresponding properties define a set of definitions of what is to be measured and the expected responses. Measurements may include density, reflectance, photoconductor voltage and stroke width.

At processing block 330, sensor 235 is defined. In one embodiment, sensor properties include sensitivity, response rate, field of view and cycle time for a complete measurement. At processing block 340, image properties of an object to be measured are defined to match sensor in order to establish a reference image.

In one embodiment, such a process includes determining spatial dimensions in process and scan direction. For instance, based on the sensor 235 properties and the printer process speed, it can be determined whether a long rectangle or a small square should be measured. The process may further include a determination as to where a measurement should be made, which will affect the timing of the measurement. For example, if density of toner on paper is needed, the measurement will be made on the page after transferring the image to paper.

If drum voltage is to be measured, the measurement would come before the image is decorated with toner by the developer unit. Finally, the process includes a determination as to the level the process variable should be for a given measurement. For instance to measure the photoconductor voltage after discharge by the print head, the exposure intensity of the print head will need to be set.

Figure 4:
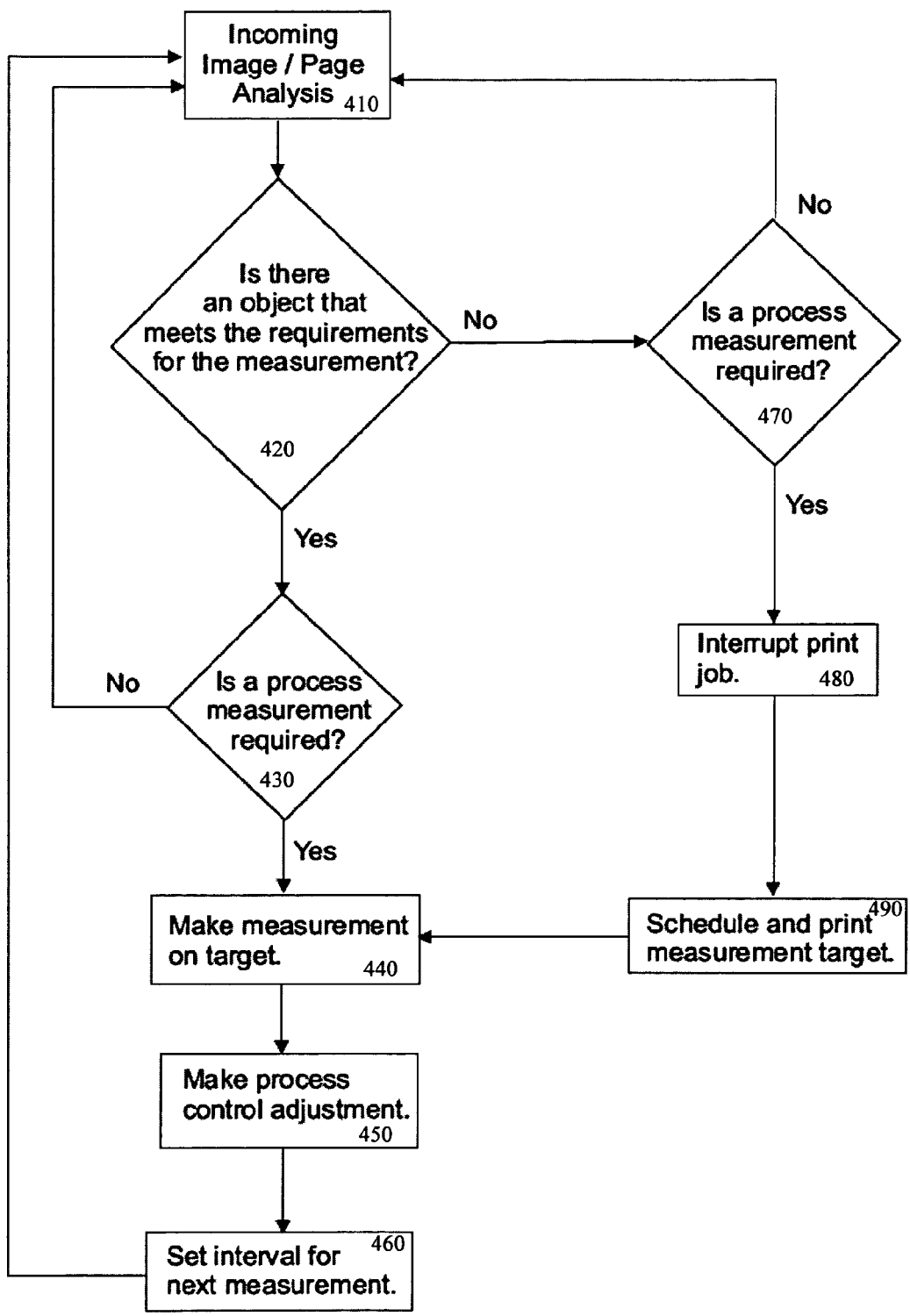
FIG. 4 illustrates one embodiment of a flow diagram for performing process control for an electrophotographic printer.

FIG. 4 illustrates one embodiment of a flow diagram for performing process control at printer 200 after the various properties are defined. At processing block 410, an image or page of a print job received at printer 200 is analyzed. At decision block 420, it is determined whether a candidate image within a print job are identified by determining if one or more of the candidate images match a defined reference image.

According to one embodiment, candidate images are identified in raster data received from rasterizer 310. As discussed above, scan line data is copied into memory array 220. With each raster scan at rasterizer 310, data is added to memory array 220 while old scans are shifted out.

After each raster scan, the stored pattern in memory array 220 is compared to one or more reference patterns associated with the reference image to determine if there is a match between the patterns of the candidate image to be printed and the reference patterns needed for the measurement. In one embodiment, a flag is set if a match is identified. Subsequently, the measurement of the attributes of the candidate image is made.

Another embodiment of identifying candidate images includes evaluating print job objects before a page is rasterized. In such an embodiment, the draw rules (e.g., location, size and content) of each received object on a page is evaluated to determine if the object matches the draw rules attributes of the reference image. For example, if discharge voltage of a photoconductor is the measurement to be made, each object on the page to be printed is evaluated to determine if the object meets the requirement for location, size and 100% fill.

Similarly, if color plane registration is to be evaluated in an inkjet printer, each object on the page would be evaluated to determine if the object meets the requirement for fill of a specific color. For example, to check the registration between the cyan and yellow, an object with a 50% green fill could be the target.

Performing the evaluation at the object level enables an embodiment in which the print job may be evaluated prior to being forwarded to printer 200. In such an embodiment, the print job may be prescreened for control measurement opportunities. Thus, there may be a determination as to whether a sufficient number of measurements can be made to control the printer during the print job. If the sensor 235 position is adjustable, prescreening a job would allow optimum positioning of sensor 235 to maximize the number of process measurements opportunities during the printing of the job.

Referring back to FIG. 4, if a candidate image is confirmed, it is determined whether a process measurement is needed at the time, decision block 430. According to one embodiment, process control measurements are conducted at intervals predetermined by a level of control of print quality that is desired. Thus, the measurement of a candidate image may occur after a predetermined time interval since a previous measurement has been made.

If a measurement is not desired at the time, control is returned to processing block 410 where a new print job is received. Otherwise, the process control measurements are conducted on the target image, processing block 440. At processing block 450, a process control adjustment is made. At processing block 460, the interval for the next measurement is set, and control is returned to processing block 410 where a new print job is received.

If at decision block 420 it is determined that there is no candidate image within the print job, it is determined whether a process measurement is needed at the time, decision block 470. This may occur, for instance, for a text only print job when a rectangular solid is required for a measurement.

If no measurement is needed, control is returned to processing block 410 where a new print job is received. However, if a measurement is needed, the print job is interrupted, processing block 480, and a measurement target is scheduled and printed at printer 200, processing block 490. Subsequently, the measurement is made, at processing block 440, using sensor 235. Control is then forwarded to processing blocks 450 and 460 where a process control adjustment is made and the interval for the next measurement is set, respectively, prior to returning control to processing block 410 where a new print job is received.

The above-described opportunistic process control mechanism reduces paper waste and printing interruptions for printer control and increase the number of process measurements during printing to enable more uniform print quality.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:
receiving print job data at an electrophotographic printer;
comparing the print job data to a digital reference image having properties that match attributes of a sensor to determine if an image within the print job data is a candidate image that may be used to perform one or more process control measurements; and
performing the process control measurement if it is determined that the image may be used.

2. The method of claim 1 further comprising:
selecting one or more variables to be measured; and
identifying properties associated with each of the one or more variables.

3. The method of claim 2 further comprising establishing the reference image.

4. The method of claim 3 wherein establishing the reference image comprises defining image properties that match attributes of the sensor.

5. The method of claim 1 wherein attributes include one or more of location, width, length and pattern of an image.

6. The method of claim 3 further comprising storing the reference image.

7. The method of claim 3 wherein comparing the print job data to a reference image comprises comparing attributes of the candidate image received in the print job data to attributes of the reference image.

8. The method of claim 7 wherein the candidate image is identified in a rasterized format of the print job data.

9. The method of claim 7 wherein the candidate image is identified by evaluating draw rules of each received object data within each page of print job data.

10. The method of claim 7 further comprising:
determining if a predetermined interval has elapsed prior to performing the process control measurement; and
performing the process control measurement if a predetermined interval has elapsed.

11. The method of claim 1 further comprising:
interrupting processing of the print job data if no image is found within the print job data that may be used to perform the one or more process control measurements;
printing a test image; and
performing the process control measurement using a sensor.

12. An electrophotographic printing system comprising:
a control unit to compare received print job data to a digital reference image having properties that match attributes of a sensor to determine if an image within the print job data is a candidate image that may be used to perform one or more process control measurements at the printing system and to perform the process control measurement if it is determined that the image may be used; and
a print head to write the print data at the electrophotographic printing system to a medium.

13. The printing system of claim 12 wherein the sensor performs the one or more process control measurements if no image is found within the print job data that may be used to perform the one or more process control measurements.

14. The printing system of claim 12 wherein the control unit determines if a predetermined interval has elapsed prior to performing the process control measurement.

15. The printing system of claim 14 wherein the control unit adjusts the predetermined interval has elapsed prior to performing the process control measurement.

16. A network comprising:
one or more data processing systems;
a print server to receive print jobs from each of the one or more data processing systems; and
an electrophotographic printer to receive the print jobs from the print server, to compare received print job data to a reference image having properties that match attributes of a sensor to determine if an image within the print job data is a candidate image that may be used to perform one or more process control measurements at the printing system and to perform the process control measurement if it is determined that the image may be used.

17. The network of claim 16 wherein the sensor performs the one or more process control measurements if no image is found within the print job data that may be used to perform the one or more process control measurements.

18. The network of claim 16 wherein the control unit determines if a predetermined interval has elapsed prior to performing the process control measurement.

19. The network of claim 16 wherein the control unit adjusts the predetermined interval has elapsed prior to performing the process control measurement.

20. The network of claim 16 wherein comparing the print job data to a reference image comprises comparing attributes of the candidate image received in the print job data to attributes of the reference image.

* * * * *